United States Patent [19]

Foote

[11] 3,994,990

[45] Nov. 30, 1976

[54] OPTICALLY BRIGHTENED NYLON MONOFILAMENT FISHING LINE

[75] Inventor: Danny R. Foote, Spirit Lake, Iowa

[73] Assignee: Berkley & Company, Inc., Spirit Lake, Iowa

[22] Filed: Nov. 12, 1975

[21] Appl. No.: 631,208

Related U.S. Application Data

[63] Continuation-in-part of Ser. No. 534,162, Dec. 19, 1974, abandoned.

[52] U.S. Cl.................. 260/857 TW; 252/301.23; 260/30.4 N; 260/78 A; 260/78 L; 260/78 SC; 264/176 F
[51] Int. Cl.² ................. C08L 77/02; C08G 69/10
[58] Field of Search ........... 260/78 SC, 78 L, 78 A, 260/857 TW, 30.4 N; 264/176 F

[56] References Cited

UNITED STATES PATENTS

| 3,147,235 | 9/1964 | Zweidler et al. | 260/78 L |
|---|---|---|---|
| 3,182,100 | 5/1965 | Bedell | 260/857 TW |
| 3,415,791 | 10/1968 | Crovatt et al. | 260/78 L |
| 3,444,142 | 5/1969 | Kolyer et al. | 260/78 L |
| 3,523,034 | 8/1970 | Howald | 428/497 X |
| 3,542,720 | 11/1970 | Kolyer et al. | 260/857 TW X |

*Primary Examiner*—Lucille M. Phynes
*Attorney, Agent, or Firm*—Orrin M. Haugen

[57] ABSTRACT

An optically brightened fishing line consisting essentially of a mixture of one or more nylon polymers and a polymer which is the reaction product of a nylon monomer or polymer and a substituted triazine and coumarin component, the substituted triazine and coumarin component having the structural formula:

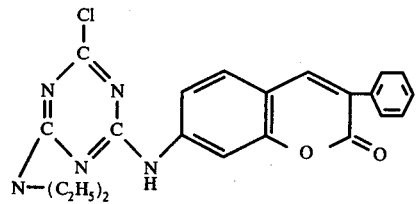

The substituted triazine and coumarin component is present in a reactant mixture in the range of from about 0.01 mol up to about 0.25 mol per mol of nylon monomer, with the reactant mixture being treated so as to form a reactant mass which is active in performing a variety of functions when reacted with nylon polymers or mixtures of polymers. Thereafter, the reactant mass is mixed with one or more nylon polymers, with the reactant normally being present in the range of about 0.1 up to about 15% by weight. The triazine-coumarin compound is the coupled product of 7-amino 3-phenyl coumarin and 2-chloro-6 diethylamino-1,3,5-triazine or 7-[2 chloro-6 diethylamino, 1,3,5-triazine 4 yl] amino 3-phenyl coumarin.

8 Claims, No Drawings

3,994,990

OPTICALLY BRIGHTENED NYLON MONOFILAMENT FISHING LINE

CROSS-REFERENCE TO RELATED APPLICATION

The present application is a Continuation-in-Part of my now abandoned application Ser. No. 534,162, filed Dec. 19, 1974 entitled "OPTICALLY BRIGHTENED MONOFILAMENT FISHING LINE", and assigned to the same assignee.

BACKGROUND OF THE INVENTION

The present invention relates generally to an improved fishing line, and more particularly to an improved nylon monofilament fishing line containing a reactive optical brightener which functions as an active component of the polymer chain performing a variety of valuable functions in the overall finished product. Thus, the invention relates to a nylon monofilament fishing line wherein the nylon monomer or mixture of monomers is polymerized in a conventional fashion, and wherein the polymerization is accomplished in the presence of a reactive component containing an optical brightener in situ.

Fishing lines prepared in accordance with the present invention are extremely stable with regard to color, and also have a high resistance to fading. Since the optical brightener is bound directly to the polymer chain or system, the permanent characteristics of the finished product are, of course, enhanced. In the polymeric system, the optical brightener component functions as a chain terminator and because of its reactant characteristics, and its uniform properties, greater uniformity of the physical properties of the finished product is obtained.

In the past, it has been traditional to mix a dye component with one or more nylon polymers in the form of pellets, with the mixture being tumbled for an extended period of time until uniformity is achieved. Thereafter, the pellets are passed through a conventional extruder to form a finished product. In accordance with the present invention, an optical brightener component is initially mixed with one, two, or perhaps more nylon monomers, with the mixture being heated until a reaction occurs between the optical brightener and the nylon monomers. In the substituted triazine and coumarin component, the reaction between the triazine-coumarin component and the nylon monomers is believed to occur at the site of the amine linking the triazine and coumarin portions, and thus the optically brightened characteristics are retained in the finished product. During the polycondensation and/or poly-addition reaction, a small quantity of the triazin-coumarin reactant is placed in admixture with one or more nylon monomers, with the entire mixture thereafter being subjected to polymerization reaction to form a finished nylon product useful as an extrudable product, or useful in admixture with other nylon constituents to form a product having exceptional optically brightened qualities and characteristics.

The initial reaction between the nylon monomer and the triazine-coumarin is continued until the triazine and coumarin component is substantially entirely reacted with the nylon monomer component, and this initial reactant product is then utilized as one component of a second reactant mixture including one or more additional nylon polymers. These "additional" nylon polymers may be from the same monomers which were employed in the preparation of the initial reaction product. The second reactant mixture is treated in the conventional fashion through an extruder until the final polyamide product is prepared. In certain instances, it may be desirable to utilize the triazine-coumarin component in a polycondensation reaction wherein this component is blended with a nylon monomer in an appropriate concentration to prepare a reactant mixture, and polymerized so as to provide in-situ formation of the optically brightened polymer desired.

The product obtained possesses good optical brightener and chroma stability, has good tensile properties, and is predictably controllable and stable in its properties, including flexural properties and characteristics. The reactant product formed from the reaction of a nylon monomer and the triazine-coumarin reactants is desirable for use in monofilament production for a variety of reasons as set forth herein. The monofilament, as a finished product, will normally be provided with a base chroma through incorporation of a pigment therein.

In conventional nylon production, spurious free monomer may be present in the finished product, with the spurious free monomer normally being water soluble. In application as a fish line, this feature is, of course, undesirable because of the constant alteration or change in physical properties of the product during use. The substituted triazine-coumarin component appears to react with the free monomer which may be present, with the finished product having been found to have a lower degree of water solubility and a greater degree of stearic hindrance. As a result, the monofilament appears to be less prone to monomer exudation. In other words, it appears that the substituted triazine-coumarin component functions as a scavenger to either react with or otherwise restrict freedom of any available free monomers or fragments thereof which may be created during the extrusion process.

As an additional advantage or characteristic, the triazine-coumarin component functions as a cyclic energy sink when coupled into the polymer structure, with the component functioning primarily as a chain terminator or end cap.

The utilization of the polymer of triazine-coumarin material and nylon contributes certain advantages in the processing. For example, the utilization of the polymer appears to alter the molecular weight distribution in the finished product, thereby providing a measure of control or "leveling" of the viscosity and other relevant characteristics in the finished product. As a further feature, it is believed that a catalytic effect occurs which alters polymer morphology and aids in production of a monofilament finished product. As has been indicated previously, the presence of the triazine-coumarin reactant product aids in stability of the finished monofilament product, including improved physical strength and stability, reduction of monomer bleeding, and an increase in chroma and optical brightening stability. It has been found that the triazine-coumarin nylon reactant product, such as may be referred to as a masterbatch, functions as a molecular lubricant for the final extrusion operation of the inter-polyamide material. This lubricant material is chemically similar and hence molecularly compatible with the ultimate constituent mixture. Inasmuch as the masterbatch has a significantly lower melt viscosity, the substance provides mobility and facilitates homogeneity when functioning as an intermolecular lubricant. Because of the nature of the overall ultimate reactant material, the masterbatch functions as a dispersing aid for the molten inter-polyamide material present in the extruder, thereby deterring phase separation. Each of these features has been found to significantly enhance the overall production capability.

SUMMARY OF THE INVENTION

Therefore, it is a primary object of the present invention to provide an improved nylon monofilament fishing line wherein the reactions forming the ultimate finished product occurs between one or more nylon polymers and a polymer comprising nylon and a rective optical brightener.

It is yet a further object of the present invention to provide an improved nylon monofilament fishing line which consists essentially of the reaction product of one or more nylon monomers together with a reactive optical brightener forming a polymer which functions as a viscosity controlling agent in reactions with additional polymer, and wherein an inert pigment is included as a base chroma.

It is yet a further object of the present invention to provide an improved nylon monofilament fishing line having a high degree of physical property stability, along with a high degree of product uniformity.

Other and further objects of the present invention will become apparent to those skilled in the art upon a study of the following specification and appended claims.

DESCRIPTION OF THE PREFERRED EMBODIMENT

In order to comprehend the various aspects of the present invention, the following specific examples are given:

EXAMPLE 1

A reactant mixture was prepared utilizing the following components, including a substituted triazine-coumarin component and a mixture of nylon homopolymers and copolymer constituents, the substituted triazine-coumarin being commercially available and having the structural formula:

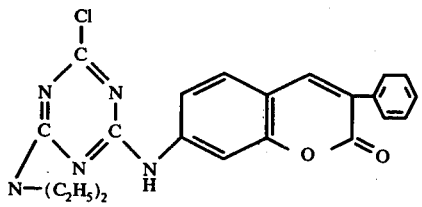

and with the nylon constituents including the following:

| Component | Melt Index* |
|---|---|
| 75% poly-caprolactam (Nylon 6); and | 1 – 3 |
| 25% of plasticized copolymer of caprolactam and 11-aminoundecanoic acid (90:10 percent by weight of Nylon 6:11) | 1 – 1.5 |
| 0.375% by weight of non-reactive pigment | |

*ASTM D-1238-70 procedure at 230° C. and 325 grams.

the plasticized copolymer being plasticized with N-butyl benzene sulfonamide to form a component material containing 8% plasticizer.

In the preparation of the initial reactant mixture including nylon constituents and substituted triazine-coumarin, the initial reactant system included 2.5% by weight of the substituted triazine-coumarin-monomer component, along with the co-monomer system consisting of caprolactam and aminoundecanoic acid. This material, after blending, was placed in a closed vessel with 8% by weight of water added blanketed with nitrogen flow, heated to a temperature of 240° C., with the temperature being increased to this level steadily over a period of 4 hours. The reactants are maintained at this temperature for a period of 4 hours at which time any further reaction is terminated. The substituted triazine-coumarin material appears to react with the nylon monomer through the —NH— group to form a masterbatch. Determinations have shown the secondary amine radical is not present in the reactant mass following the reaction, thus leading to the conclusion that the reaction occurs at the site of the —NH— group.

In the ultimate extrusion of the monofilament product, 1% of the reactant product of a nylon and substituted triazine-coumarin (masterbatch) with a melt index of about 50 was introduced into the main nylon copolymer/homopolymer mixture described above, to form an inter-polyamide product having exceptional stability chracteristics.

The material is tumble-blended for 1 hour at which time it is homogeneous. This mixture was then introduced into an extruder. The non-reactive pigment is that certain yellow pigment sold by Ciba-Geigy Corporation of Ardsley, New York under the designation "2-GLT Yellow Pigment, Irgazin".

In forming the product, the mixture was fed through a screw extruder and extruded into a monofilament which was thereafter cooled and oriented through stretching, in order to obtain the maximum possible strength. As is conventional in the art, orientation is accomplished by stretching the filament to a length of approximately five times its extruded dimensional length. The material in the extruder was heated to approximately 245° C. and was thereafter permitted to remain no longer than a few minutes at this exposure temperature, during which time it was moved through the auger of the standard extruder. Upon leaving the extruder, the filament was immediately chilled and thereafter stretched. The diameter of the stretched monofilament in this example was 12 mils. The tensile strength of the line was approximately 110,000 psi.

The preparation of a reactant product from the substituted triazine-coumarin component and nylon component is normally conducted with no more than a slight excess of substituted triazine-coumarin being present. In this arrangement, therefore, the function of the reactant product as a chain terminator is more reliable, predictable, and consistent.

EXAMPLE 2

A reactant mixture was prepared as set forth in Example 1, with the exception being that 25% of the substituted triazine-coumarin component was added to a mixture of nylon monomers consisting of 85% by weight of episilon-caprolactam, and 15% omega-aminoundecanoic acid. This material was treated in accordance with the process described in Example 1 and was ultimately added to the main nylon copolymer/homopolymer in an amount equalling 1% by weight of the substituted triazine-coumarin nylon monomer, with comparable results as set forth in Example 1 being obtained.

EXAMPLE 3

The substituted triazine-coumarin and nylon reactant mixture was prepared as set forth in Example 1, with this material being added to the following main copolyamide mixture:

A 6/66 polyamide copolymer consisting of the reaction product of 25% caprolactam (Nylon 6) and 75% hexamethylene adipamide (Nylon 66)

and 0.375% of the pigment described in Example 1 is added to the copolymer. A total of 1% of the substituted triazine-coumarin nylon reactant product was added to this polyamide copolymer to obtain an extrudable product useful as a monofilament fishing line. The material was treated pursuant to the process described in Example 1 and a monofilament line having an oriented diameter of 12 mils was obtained, with the material having a tensile strength of about 105,000 psi.

EXAMPLE 4

The substituted triazine-coumarin and nylon reactant mixture was prepared as set forth in Example 1, with this material being added to a mixture of nylon homopolymer, copolymers and terpolymers including the following:

25% poly-caprolactam (Nylon 6); and
50% of plasticized copolymer of caprolactam and 11-aminoundecanoic acid (90:10 percent by weight of Nylon 6:Nylon 11); and
25% of a terpolymer consisting of caprolactam hexamethylene adipamide and hexamethylene sebacamide, with the percentages by weight being 30/40/30; and
.02% by weight of a non-reactant pigment;

the plasticized copolymer being plasticized with N-ethylortho and para-toluene sulfonamides to form a component material containing about 7% plasticizer. These plasticizers are commercially available. The non-reactant pigment is that certain green pigment sold by Harshaw Chemical Co. of Cleveland, Ohio under the designation "Zulu Green Dye 3824". The material is tumble-blended for an hour at which time it is homogeneous. In the extrusion of a monofilament product, 5% of the substituted triazine-coumarin-nylon reactant product was introduced into the polyamide mixture described above. The material was treated as in Example 1 and a monofilament line having an oriented diameter of 12 mils was obtained with the material having a tensile strength of about 100,000 psi demonstrating exceptional stability characteristics.

EXAMPLE 5

The substituted triazine-coumarin and nylon reactant mixture was prepared as set forth in Example 1, with this material being added to Nylon 6 homopolymer with 0.001% by weight titanium dioxide being added as a de-glossing agent. A total of 1% of the substituted triazine-coumarin-nylon reactant product was added to obtain an extrudable product useful as a monofilament fishing line. The material was processed as in Example 1, with a monofilament line having an oriented diameter of 12 mils being obtained, the material having a tensile strength of about 95,000 psi.

EXAMPLE 6

The substituted triazine-coumarin and nylon polymer mixture as described in Example 1 was prepared and added to a mixture of nylon terpolymer and copolymer. The terpolymer was a nylon identified as "Nylon 6/610/66", with the percentage by weight of the three components being 30%:30%:40%, with additional quantities of the copolymer of Example 1 being used. An extrudable mixture was prepared in which the concentration of the substituted triazine-coumarin component was about 0.25%. This material, upon extrusion into the monofilament fishing line, demonstrated higher knot tensile and greater flexibility as measured by an Instron Model TM tensile testing machine and by conventional beam stiffness testing. When comparing tensile data of the polyamide composition containing the triazine-coumarin entity with tensile data of the polyamide composition alone indicates knot tensile is increased 3.5%. The flexibility was measured as 157,000 psi as compared to stiffer control sample of 167,000 psi.

EXAMPLE 7

A masterbatch concentrate was prepared as in Example 1, with this material being mixed with the same main nylon copolymer/homopolymer system as was utilized in the preparation of the product as set forth in Example 1. In this material, however, the system included 10% by weight of the substituted triazine-coumarin-monomer component along with the main copolymer/homopolymer system as set forth in Example 1. A finished product was obtained having a tensile strength of approximately 105,000 psi.

EXAMPLE 8

A substituted triazine-coumarin and nylon polymer mixture was prepared utilizing the substituted triazine-coumarin material as set forth in Example 1 with the nylon constituent being the following:
70% Nylon 6 (caprolactam) (by weight)
30% Nylon 66 (hexamethylene adipamide) (by weight)

The initial reactant mixture included 10% by weight of the triazine-coumarin material, balance nylon. The initial material, after blending, was plced in a closed vessel with 8% by weight of water added, the material blanketed with a continuous nitrogen flow, and heated steadily to a temperature of about 280° C. over a period of 4 hours. The reactants were maintained at this temperature for a period of 4 hours at which time the reaction was complete. This material was then blended with Nylon 6 homopolymer in a ratio of 5% of the masterbatch, balance Nylon 6 homopolymer. An extruded monofilament line was obtained having an oriented diameter of 12 mils, with the material having a tensile strength of about 95,000 psi.

EXAMPLE 9

A masterbatch concentrate was prepared having the following formulation:
99% constituent homopolymer, Type 6 Nylon
1% of the triazine-coumarin component This mixture is blended by tumbling until homogeneous. Thereafter, with 8% by weight of water added, the material is placed in a closed vessel, heated to a temperature of 240° C. with the temperature being increased to this level steadily over a period of 4 hours. The reactants are maintained at a temperature of 240°

C. for an additional period of 4 hours at which time the reaction is terminated.

An amount of 10% of the triazine-coumarin-nylon reactant product is added to a plasticized copolymer of Type 6 and Type 11 Nylon (85:15 Type 6 to Type 11 Nylon) and this mixture is fed through a conventional screw extruder heated to a temperature of 245° C., and while being maintained in the extruder barrel for a period of 3 minutes, it was passed through the auger chamber and extruded and thereafter cooled. Orientation of the filament was accomplished by stretching to a length of five times the original dimensional length, with the stretched monofilament having a finished diameter of 12 mils.

EXAMPLE 10

The polyamide copolymer as set forth in Example 9 was prepared utilizing 0.05% of a pigment identified as "Zulu Blue No. 4860" of Harshaw Chemical Co. of Cleveland, Ohio, with the amount of triazine-coumarin-nylon reactant being 7%, it being ascertained that the presence of the pigment does not adversely affect the tensile properties of the monofilament structure.

EXAMPLE 11

A substituted triazine-coumarin and nylon polymer mixture was prepared utilizing the following nylon component:
  95% by weight of poly-caprolactam (Nylon 6)
  5% by weight of 11-aminoundecanoic acid (Nylon 11)

The nylon constituent was mixed with the substituted triazine-coumarin material in a ratio of 99% nylon, 1% triazine-coumarin. This material, after blending, was placed in a closed vessel with 7.5% by weight of water added, blanketed with a continuous nitrogen flow, and heated to a temperature of 240° C., with the temperature being increased steadily to this level over a period of 4 hours. the reactants were maintained at this temperature for an additional period of 4 hours at which time any further reaction was terminated.

This masterbatch material was then placed in a nylon matrix having the following composition:

Component 30 parts by weight caprolactam (Nylon 6);
40 parts by weight hexamethylene adipamide (Nylon 66);
30 parts by weight hexamethylene sebacamide (Nylon 610)

This material, which does not require a plasticizer, was blended with 10% by weight of the masterbatch set forth in Example 11, and extruded into a monofilament having an oriented diameter of 12 mils and with a tensile strength of about 85,000 psi.

EXAMPLE 12

The monofilament finished product as set forth in Example 11 was prepared with the exception of a non-reactive pigment being added, this being identified as that certain pigment sold by Harshaw Chemical Co. of Cleveland, Ohio under the code designation "Zulu Green 3824". This pigment was incorporated in the product in an amount of 0.02% by weight.

EXAMPLE 13

The substituted triazine-coumarin and nylon polymer mixture as set forth in Example 8 was modified in that the composition contained 5% of triazine-coumarin material, balance nylon constituent as in Example 8. This material was treated as the formulation in Example 8 in order to obtain the final masterbatch material.

The masterbatch material was then blended with the homopolymer of caprolactam (Nylon 6) (98% homopolymer, 2% masterbatch) and extruded as a monofilament fishing line. The material having an oriented diameter of 12 mils exhibited a tensile strength of 95,000 psi.

EXAMPLE 14

The formulation as set forth in Example 13 was prepared with the exception of a pigment being added, the pigment being that certain green pigment sold by Harshaw Chemical Co. of Cleveland, Ohio under the code designation "Zulu Green 3824". The pigment was incorporated in an amount equal to 0.02% by weight of product.

EXAMPLE 15

A substituted triazine-coumarin and nylon polymer mixture was prepared utilizing aminoundecanoic acid (Nylon 11) and the triazine-coumarin compound of Example 1, with the triazine-coumarin compound being incorporated in the reactant mixture in an amount equal to 5% by weight, balance aminoundecanoic acid (Nylon 11). This material was reacted in the process as set forth in Example 1, whereupon the masterbatch was mixed with a main nylon copolymer having the following formulation:

Component

A plasticized copolymer of caprolactam (Nylon 6) and 11-aminoundecanoic acid (Nylon 11) on an 85:15 molar basis.

This material was utilized to prepare an extrudable mixture containing 97% of the main nylon copolymer, balance of 3% of the masterbatch set forth herein. The resulting product was a monofilament line having an oriented diameter of 12 mils with a tensile strength of about 110,000 psi.

EXAMPLE 16

A substituted triazine-coumarin and nylon polymer mixture was prepared utilizing the following components:
  99% by weight of a terpolyamide comprised of the polymerized product of caprolactam, hexamethylene adipamide and hexamethylene sebacamide (in a weight ratio of 40:30:30)
  1% of the triazine-coumarin component.

The monomeric mixture is blended by tumbling until homogeneous. Thereafter with 8% by weight of water added, the material is placed in a closed vessel, heated to a temperature of 240° C. with the temperature being increased steadily over a period of 4 hours. The reactants are maintained at a temperature of 240° C. for an additional period of 4 hours, at which time reaction is terminated.

An amount of 10% of the masterbatch was added to the terpolyamide composition of pigment of Example 12. The mixture was extruded into a monofilament having an oriented diameter of 12 mils and with a tensile strength of about 85,000 psi.

EXAMPLE 17

A reactant mixture was prepared utilizing the substituted triazine-coumarin component as set forth in Example 1, with the nylon constituent as follows:

Component

95% by weight caprolactam (Nylon 6)
5% by weight 11-aminoundecanoic acid (Nylon 11)
To this mixture was added a quantity of 0.1% by weight of the substituted triazine-coumarin component.

This material, after blending, was placed in a closed vessel with 8% by weight of water and blanketed with a nitrogen flow, heated to a temperature of 240° C., with the temperature being increased to this level steadily over a period of 4 hours at which time any further reaction was terminated. This reactant product was then introduced into an extruder, with the extruder being heated to approximately 245° C., and with the material being permitted to remain no longer than a few minutes at this temperature, during which time it was moved through the auger of the extruder. Upon leaving the extruder, the filament was immediately chilled and thereafter stretched to orient the product. The diameter of the stretched oriented monofilament was 12 mils, with the tensile strength being approximately 90,000 psi.

NYLON COPOLYAMIDE MATERIAL

While the selection of the nylon copolyamide or inter-polyamide is not critical to the concept, it has been found that conventional Type 6 Nylon homopolymers, copolymers of Type 6 and Type 11 Nylon, Type 6 and Type 66, as well as the inter-polyamides of 6/11, 6/66 and mixtures thereof, as well as formulations of 6/610/66 work exceptionally well. The preparation of the later copolyamides or inter-polyamides is set forth in detail in U.S. Pat. No. 3,182,100, Berkley W. Bedell. It will, of course, be appreciated that other nylon polymers or compolymers may be utilized as well.

DISCUSSION OF COMPONENTS

A. Substituted Triazine-Coumarin

As has been indicated, the substituted triazine-coumarin product useful in the present invention has the following structural formula:

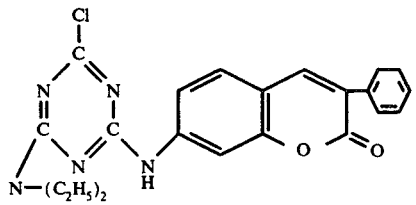

known as 7-[2 chloro-6 diethylamino, 1,3,5-triazine 4 yl] amino 3-phenyl coumarin. These materials have been found to be functional for the intended purpose, with the —NH— group appearing to join in the reaction with the nylon monomer to form the chain terminator.

As has been indicated, the masterbatch of triazine-coumarin constituent and nylon will normally contain between about 1 up to about 15% of the triazine-coumarin material. However, in certain instances, a lower concentration, such as, about 0.1%, or higher concentrations of up to about 20% may be employed. When the mixture of Nylon 6 and Nylon 11 is employed on an 85:15 basis, approximately 10% is to be preferred. Normally, a range of between about 0.01% up to about 1% of the triazine-coumarin constituent is present in the finished product.

The triazine-coumarin constituent as set forth in the above-identified structural formula melts at a temperature of between 201°–202° C., and the 85:15 Nylon 6 and Nylon 11 copolymer melts in the same general range, that is, at a temperature range of 190°–210° C.

The triazine-coumarin constituent absorbs ultraviolet light in the range of approximately 3400 A°, with the radiation being re-emitted at 4400 A°. Thus, the light energy which is absorbed is below the visible range, while being re-emitted in the visible range for most humans. In utilization of this material, it is normally desirable to select compatible pigments which emit in the same general range, that is, in the range of approximately 4400 A°, which is found in most of the blue, yellow and green pigments. Those pigments which absorb significantly in the range of 4400 A° are normally not recommended inasmuch as they tend to destroy the optical brightening effect. Such pigments which are not recommended are those in the red and brown range.

In the concentrations utilized, the triazine-coumarin component does not in any way contribute to the base chroma, with the base chroma being obtained from the pigment utilized.

B. Nylon Polymer or Copolymer

As has been indicated, it is preferred that a mixture of caprolactam and 11-aminoundecanoic acid be utilized. This polymer system, the monomers of which are readily commercially available, is desirable from the standpoint of its compatibility with the other nylon materials, and also because of the initiator activity of 11-aminoundecanoic acid.

When this polymer system is selected, varying ranges of the materials may be utilized, with anywhere from 50% of caprolactam up to about 95% caprolactam being found useful.

As has been indicated, it is desirable to utilize the polymer system of Nylon 6-Nylon 11 because of the similarity of melting points, It will be appreciated, of course, that other nylon systems may be employed inasmuch as solvent systems or high melting nylons may not adversely affect the overall quality of the finished product.

PRODUCT CONSIDERATIONS

It has been found that the masterbatch procedure described herein provides a finished product which does not degrade in its optical properties upon exposure to the sun. The optical brightening remains throughout the finished product as characterized by having higher knot strength and increased flexibility.

As has been indicated, the triazine-coumarin optical brightener absorbs incident ultraviolet light in the 3400 A° range, while re-emitting the energy in the 4400 A° range. This particular wave length for emitted energy may vary slightly with the polymer media, but for a nylon system, the 4400 A° range is accurate.

For most humans, the lower range of vision normally commences at approximately 4100 A°, with sensitivity increasing with wave length until a peak sensitivity is reached at about 5500 A°. Studies have been made for optical sensitivity in fish, and it has been found that the peak sensitivity range for fish normally lies in the range of 5500–6000 A°. For the lower threshold of chroma sensitivity, fish appear to have very little, if any, sensitivity in the 4400 A° range. Therefore, the emission of a somewhat blueish color from triazine-coumarin treated nylon line having a yellow pigment provides a color in the area of low sensitivity for the optical system of fish.

A further advantage is found in the absorption of incident radiation which tends to deteriorate conventional nylon systems. Specifically, the absorption of radiation in the range of approximately 3400 A° units reduces the adverse effect of exposure to sunlight upon the nylon polymer. This stability and permanence is available in the system.

In other words, ultraviolet radiation is generally harmful to polymer structures, and including nylons, with the critical region of radiation being in the range of 3550–3850 A°. Exposure to radiation with this wave length generally will result in a loss of elasticity, strength, and general suppleness. Generally speaking, the photo degradation occurs as an oxidative degradation. Protection may be achieved through utilization of ultraviolet screens or incorporation of anti-oxidents. The present system provides an energy conversion for the incident radiation which is close to the critical range of degradation, converting the energy to a more harmless wave length, such as in the 4400 A° range.

I claim:

1. A fishing line consisting essentially of the inter-polymeric reaction product of at least one nylon polymer and a nylon polymeric chain terminator, said nylon polymeric chain terminator being the reaction product of:
    a. a nylon polyamide component and a substituted triazine-coumarin coupled component having the structural formula:

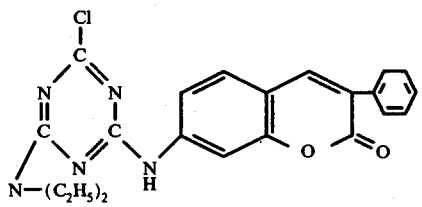

wherein said substituted triazine-coumarin component is included in the reaction product in the range of from about 0.01 mol up to about 0.25 mol per each mol of nylon monomer;
    b. said nylon polymeric chain terminator being present in said inter-polymeric reaction product in an amount of from between about 0.1 and 15% by weight, balance nylon polymer.

2. The fishing line as defined in claim 1 being particularly characterized in that said triazine-coumarin component is included in the reaction product in the range of about 0.125 mol of triazine-coumarin component per mol of nylon monomer.

3. The fishing line as defined in claim 1 being particularly characterized in that said nylon polymeric chain terminator is the reaction product of said substituted triazine-coumarin component and a copolymeric mixture of caprolactam and 11-amminoundecanoic acid.

4. The fishing line as defined in claim 3 being particularly characterized in that said copolymeric mixture of caprolactam and 11-aminoundecanoic acid contains 85% by weight caprolactam, balance 11-aminoundecanoic acid.

5. The fishing line as defined in claim 4 being particularly characterized in that said substituted triazine-coumarin component is present in said reaction product in an amount of approximately 0.1 mol for each mol of nylon monomer.

6. The fishing line as defined in claim 1 being particularly characterized in that said inter-polymeric product is a stretch-oriented monofilament fishing line 7. The method of preparing a nylon inter-polymeric fishing line which includes the steps of:
    a. preparing a first reactant mixture consisting of a mixture of a substituted triazine-coumarin reactant and at least one nylon amide reactant;
    b. heating said reactants to a temperature of between about 230°–250° C. for a period of approximately 8 hours to form a nylon polymeric chain terminator;
    c. introducing the reactant product into a nylon inter-polymer reactant in the range of between about 0.1 and 15% of said nylon polymeric chain terminator, balance nylon inter-polymer reactant to form a second reactant mixture; and
    d. heating said second reactant mixture until molten and then extruding said second reactant into a nylon monofilament product.

8. The method as defined in claim 7 being particularly characterized in that said nylon polymeric chain terminator is the reaction product of 7-amino-3-phenyl coumarin and 2-chloro-6-diethylamino-1,3,5-triazine and a blend of nylon amide reactants consisting of 85% caprolactam and 15% 11-aminoundecanoic acid.

Disclaimer

3,994,990.—*Danny R. Foote*, Spirit Lake, Iowa. OPTICALLY BRIGHTENED NYLON MONOFILAMENT FISHING LINE. Patent dated Nov. 30, 1976. Disclaimer filed Aug. 20, 1980, by the assignee, *Berkley & Company, Inc.*

The term of this patent subsequent to November 30, 1993 has been disclaimed.

[*Official Gazette October 14, 1980.*]